United States Patent [19]
Anzilotti et al.

[11] Patent Number: 5,474,006
[45] Date of Patent: Dec. 12, 1995

[54] ELASTIC TUFTED FABRIC INCLUDING NONWOVEN FIBROUS SUBSTRATE

[75] Inventors: Keith W. Anzilotti, Newark; Dimitri P. Zafiroglu, Wilmington, both of Del.

[73] Assignee: E. I. Du Pont de Nemours and Company, Wilmington, Del.

[21] Appl. No.: 978,473

[22] Filed: Nov. 18, 1992

Related U.S. Application Data

[63] Continuation-in-part of Ser. No. 796,275, Nov. 22, 1991, abandoned.

[51] Int. Cl.⁶ .......................... D05C 17/02; D04H 11/00
[52] U.S. Cl. .............................. 112/410; 428/95
[58] Field of Search ................... 112/402, 410, 112/7, 9; 28/103, 159; 156/72; 66/194; 428/85, 95, 102, 97, 219

[56] References Cited

U.S. PATENT DOCUMENTS

| | | | |
|---|---|---|---|
| 3,166,465 | 1/1965 | Rahmes | 428/95 X |
| 3,324,067 | 6/1967 | Donaldson et al. | 428/95 |
| 3,605,666 | 9/1971 | Kimmel et al. | 112/410 |
| 3,719,546 | 3/1973 | Parlin | 161/55 |
| 3,975,562 | 8/1976 | Madebach et al. | 428/95 |
| 4,053,668 | 10/1977 | Kimmel et al. | 112/410 X |
| 4,131,704 | 12/1978 | Erickson et al. | 428/95 |
| 4,181,762 | 1/1980 | Benedyk | 28/159 X |
| 4,187,337 | 2/1980 | Romageon | 428/95 |
| 4,210,690 | 7/1980 | Hartmann et al. | 428/95 |
| 4,508,771 | 4/1985 | Peoples et al. | 428/95 |
| 4,515,854 | 5/1985 | Kocamls et al. | 28/103 X |
| 4,677,011 | 6/1987 | Matsuda | 428/88 |
| 4,842,915 | 6/1989 | Hartmann et al. | 428/95 |
| 4,876,128 | 10/1989 | Zafiroglu | 428/102 |
| 4,998,421 | 3/1991 | Zafiroglu | 66/192 |
| 5,256,224 | 10/1993 | Gillyns et al. | 156/72 |

FOREIGN PATENT DOCUMENTS 2028433  2/1987  Japan ................... 112/410

OTHER PUBLICATIONS

Bahlo, K. W., "New Fabrics without Weaving", AATT Paper, presented Sep. 8, 1965, *Modern Textiles Magazine*, pp. 51–54 (Nov. 1965).

*Primary Examiner*—C. D. Crowder
*Assistant Examiner*—Ismael Izaguirre

[57] ABSTRACT

A tufted pile nonwoven fabric with an elastomeric backing has an elastic stretch of at least 10% and is particularly suited for floor coverings, upholstery, seat covers, etc. A stitchbonded fabric is employed as a preferred substrate for the elastic tufted fabric.

3 Claims, 1 Drawing Sheet

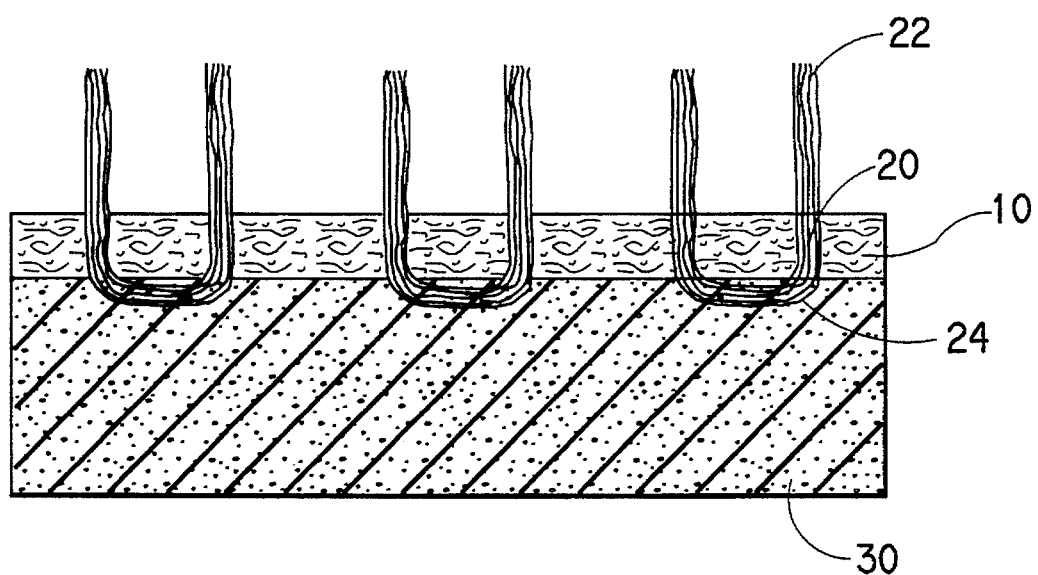

ELASTIC TUFTED FABRIC INCLUDING NONWOVEN FIBROUS SUBSTRATE

CROSS-REFERENCE TO RELATED APPLICATION

This application is a continuation-in-part application of U.S. application Ser. No. 07/796,275, filed Nov. 22, 1991, now abandoned.

BACKGROUND OF THE INVENTION

1. Field of the Invention

The present invention relates to a tufted pile fabric that has a nonwoven fibrous substrate, yarns tufted through the substrate and an elastomeric backing which adheres to the substrate and fixes the base of the tufts in the substrate. More particularly, the invention concerns such a tufted pile fabric which is strong and elastic and is suited for use as floor coverings, scatter rugs, upholster, fitted seat covers, bathroom accessory covers, and the like. The invention also concerns a process for making the tufted pile fabric.

2. Description of the Prior Art

Conventional tufted pile nonwoven fabrics, especially those intended for use in carpets, upholstery and the like, usually have very little, or almost no, elastic stretch. Generally, such conventional tufted fabrics are made with fibrous substrates that in themselves are very stiff (e.g., less than 5% stretch) and inelastic. Among the typical substrates used for conventional tufted pile nonwoven fabrics are woven fabrics of jute fibers or polypropylene strands, bonded nonwoven fabrics of polypropylene filaments, certain bonded spunbonded fabrics and the like. The lack of stretchability and elasticity in conventional tufted pile nonwoven fabrics lifts the utility of the fabrics. Accordingly, a purpose of this invention is to provide a tufted pile nonwoven fabric that has elastic stretch.

SUMMARY OF THE INVENTION

The present invention provides an improved tufted pile fabric. The fabric is of the type that has a nonwoven fibrous substrate, yarns tufted through the substrate and an elastomeric backing adhered to the substrate, the yarns forming pile tufts that protrude from the top face of the substrate and tufted yarn bases that penetrate and re-enter the bottom face of the substrate. In accordance with the improvement of the invention, the tufted-and-backed pile fabric has an elastic stretch of at least 10%, preferably at least 20%, in the longitudinal direction of the fabric (referred to hereinafter as "LD") and/or in the transverse direction of the fabric (referred to hereinafter as "TD") and a grab strength in the LD and TD of at least 30 lb (134 Newtons), preferably 50 lb (223 N). Preferred nonwoven fibrous substrates include (a) a stitchbonded fabric of substantially nonbonded staple fibers of textile decitex that was multi-needle stitched with a textured non-elastomeric thread and (b) a nonwoven fabric of substantially nonbonded continuous filaments of textile decitex.

The improved process of the invention is of the type which includes the steps of feeding a nonwoven fibrous substrate to a tufting machine, tufting the substrate with yarns that form tufted pile yarns protruding from the top surface of the substrate and yarn bases penetrating and re-entering the bottom surface of the substrate, and then adhering an elastomeric latex back-coating to the bottom of the tufted substrate. The improvement of the invention comprises feeding a nonwoven fibrous substrate that is composed of substantially nonbonded staple fibers or of substantially nonbonded continuous filaments, the fibers or filaments being of textile decitex and the substrate having a break elongation in the LD and/or in the TD of at least 20%. In another preferred embodiment of the process, the nonwoven fibrous substrate that is fed to the tufting machine has a break elongation in the range of 40 to 125%, and is a stitchbonded fabric comprising a layer of substantially nonbonded fibers or filaments of textile decitex multi-needle stitched with textured non-elastomeric yarn.

BRIEF DESCRIPTION OF THE DRAWINGS.

The invention will be better understood by referring to the attached drawing which is a schematic representation of a cross-section of an elastic cut-pile tufted fabric of the invention. Nonwoven fibrous substrate 10 is penetrated by yarn 20 which formed tufts 22 extending above the top surface of substrate 10 and bases 24 that protrude through and re-enter the back surface of substrate 10. An elastomeric backing 30 is adhered to the back of substrate 10 and fixes the bases of the tufted yarn in place.

DETAILED DESCRIPTION OF PREFERRED EMBODIMENTS

The invention is further illustrated by the following description of preferred embodiments.

In accordance with the present invention the elastic tufted fabric typically weighs in the range of 6 to 70 oz/yd$^2$ (200 to 2,370 g/m$^2$) and comprises 2 to 40 oz/yd$^2$ (68 to 1,360 g/m$^2$) of tufting yarn, 2 to 6 oz/yd$^2$ (68 to 200 g/m$^2$) of fibrous substrate and 2 to 20 oz/yd$^2$ (68 to 680 g/m$^2$) of elastomeric backing. However, fibrous substrates, when made of substantially nonbonded continuous filament nonwoven fabrics, as illustrated in Example 4 below, can weigh as little as 1 oz/yd$^2$ (34 g/m$^2$).

Conventional tufting equipment and tufting yarns can be used to prepare an elastic tufted fabric of the invention, provided one employs an appropriate nonwoven fibrous substrate. Generally, the substrate, before tufting has a break elongation in the LD and/or TD of at least 20% and preferably, a grab tensile of at least 50 lb (22 Kg) in both the LD and TD. Further preferred substrates have break elongations in the range of 40 to 125% and grab tensile strengths in both directions of at least 60 lb (27 Kg). Substrates of lesser strength but of the desired stretchability can be employed, if care is exercised to prevent excessive neckdown and little out-of-plane deflection in the tufting step. The preferred substrates of relatively higher grab strength generally exhibit low "neck down" when placed under tension and little deflection out of plane when subjected to tufting. For example, such preferred substrates exhibit less than 5% neck-down (i.e., pulling in from the edges) when a 1-meter-long, 1.5-meter-wide sample is subjected to a load of 0.9 kg/cm of width and deflect less than 0.5-cm out of plane when subjected to tufting.

As used herein, the term "substantially nonbonded" means that the fibers are generally not adhered or bonded to each other, as by chemical or thermal action. "Fibers" is intended to include staple fibers and/or filaments of natural materials or of synthetic organic polymer. "Textile decitex" means fibers having a dtex in the range of about 1 to 22.

Various types of fibrous layers can be employed to produce fibrous nonwoven substrates that are suited for use in the present invention. Among such potentially suitable fibrous layers are certain spunlaced fabrics, felts, spunbonded fabrics, and the like. Some such layers can be used as is; for example, the continuous polyester filament nonwoven fabrics illustrated below in Examples 4–6. However, for preferred substrates, the starting fibrous layer usually is stitchbonded. For example, batts of carded fibers, air-laid fiber webs, nonwoven continuous filament sheets, spunlaced fabrics of hydraulically entangled fibers and the like are suitable fibrous layers for stitchbonding.

In one preferred embodiment of the invention, the nonwoven fibrous substrate comprises a web of substantially nonbonded fibers of textile decitex that is multi-needle stitched (i.e., conventionally "stitchbonded") with non-elastomeric textured yarns, preferably of polyester or nylon. Stitchbonding can be performed with conventional multi-needle stitching equipment. Although flat yarns can be employed for the stitching thread when certain stitch patterns are used in the stitchbonding operation, non-elastomeric textured yarns are preferred. Covered elastomeric stitchbonding yarns could be used to provide elasticity to the fibrous substrate, but such elastomeric yarns are not included in the present invention; their higher cost and greater difficulty in handling make them less desirable for use in the present invention. Note that although the fibrous substrates for use in the present invention are stretchable, they are not elastic. It is only after the backing has been applied to the tufted substrate that the pile fabric of the invention achieves elasticity.

Substrates having wide ranges of directionality, stretch and strength characteristics can be produced by using various combinations of fibrous layer, stitching thread and stitch pattern. Also, as with other fabrics, the directionality, stretch and strength characteristics of the substrate can be adjusted by subjecting the substrate to additional treatments, such as directional stretching, shrinking and heat setting, before or after the substrate is tufted. Such methods for adjusting fabric properties are illustrated in the Examples below.

In making elastic tufted fabrics of the invention, conventional tufting equipment is employed to tuft the fibrous substrate. Generally, the tufting yarn adds 2 to 40 oz/yd$^2$ (68 to 1,360 g/m$^2$) to the substrate weight. A wide variety of tufting yarns can be used, ranging from heavy carpet yarns (e.g., 4,000 dtex) to lightweight fine upholstery yarns. To avoid excessive deflection and wear of tufting needles, use of a very heavy or very dense substrate is avoided. Usually, the substrate does not weigh more than about 6 oz/yd$^2$ (200 g/m$^2$). Substrates having weights in the upper part of the range of suitable weights usually provide better "tuft lock" for the pile yarns (i.e., more uniform and firmer retention of the tufting yarn in the fabric). Substrates weighing as little as 1 oz/yd$^2$ (34 g/m$^2$) can be used satisfactorily, especially with lightweight tufting yarns, but usually substrates of less than 2-oz/yd$^2$ (68 g/m$^2$) are seldom used. Best tuft uniformity and raft lock usually are obtained when one employs low needle penetration forces and a substrate in which fibers tend to return to their original position after tufting. The stretchability of the tufted substrate sometimes is lower than the stretchability of the starting substrate.

An elastomeric backing, usually weighing in the range of 2 to 20 oz/yd$^2$ (68 to 680 g/m$^2$) is applied to the tufted substrate. The backing can be adhered to the substrate by means of an adhesive or self-adhered by conventional coating techniques. Suitable backing materials include rubber latexes, solid or foamed layers of natural or synthetic rubbers, elastomeric films and the like. The elastomeric backing suited for use in the invention has an elastic stretch in both the LD and TD of at least 10%, preferably in the range of 20 to 125% and usually constitutes at least 10% of the total weight of the final elastic tufted fabric.

The directional characteristics of the tufted-and-back-coated elastic tufted fabric can be further adjusted by additional stretching, shrinking and heat-setting treatments, in the same manner as these characteristics could be adjusted in the substrate and tufted substrate.

TEST PROCEDURES

Various characteristics, discussed above and in the examples below, were measured as follows.

ASTM D 1117-80 (paragraph 7) was used to measure grab tensile strength in pounds with a 4-in-wide (10.2-cm) sample and a 2-in (5.1-cm) jaw separation.

"Stretchability" (%$S_b$) is calculated from the grab tensile test results. Stretchability is calculated from (%$S_b$)= 100($L_b$–$L_o$)/$L_o$, where $L_b$ is the sample length at break and $L_o$ is the original sample length.

"Elastic stretch" of the tufted fabric is measured by subjecting a 2-in (5.1-cm) wide, 4-in (10.2-cm) long sample to a load of 10 lb (4.5 Kg), measuring the elongation, removing the load and re-measuring the sample length. The % elastic stretch is calculated from %$S_e$=100($L_e$–$L_f$)/$L_o$, where $L_e$ is the length of the loaded sample, $L_f$ is the length of sample after removal of the load and $L_o$ is as defined above.

EXAMPLES

The following six examples illustrate the preparation of two types of pile fabrics of the invention. In one type of pile fabric, the starting stretchable-but-not-elastic nonwoven fibrous substrate was formed from substantially nonbonded staple fiber webs that were stitchbonded with textured non-elastomeric yarns (Examples 1–3). In the second type of pile fabric of the invention, the starting stretchable-but-not-elastic nonwoven fibrous substrate was a substantially non-bonded spunbonded fabric of polyester filaments (Examples 4–6). In the examples, the samples of the invention are compared to a similarly tufted sample (designated Comparison A) prepared with from a known thermally bonded, spunbonded primary carpet backing of polypropylene filaments.

Each fibrous substrate sample of the invention or comparison sample was tufted with an 8-inch (20-cm) wide table-top tufting machine having with two staggered rows of tufting needles. Tufted fabric was produced at a rate of about one-meter/minute. Singer Type 0772 (RH Round) tufting needles were employed. At their largest cross-section, the needles measured about 0.06 inch by 0.16 inch (0.15 by 0.41 cm). Tufting yarns were inserted into the substrates every 0.16 inch (0.41 cm) in the LD and in the TD to form about 39 cut-loop pile tufts per square inch (6.3/cm$^2$). Substrates were held under tension in the machine-direction (LD) during tufting. A 1,405-denier (1,610 dtex), 80-filament, Type-605 "Antron" nylon carpet yarn was used as the tufting yarn. Tufts of ½-inch (1.3-cm) height (cut pile loops) were formed. About 21 oz/yd$^2$ (710 g/m$^2$) of tufting yarn was inserted into the fabric.

Each tufted substrate was back-coated with a foamed rubber latex that was applied with a foam spreader and doctor knife in an amount that resulted in a dried-and-cured 8-oz/yd$^2$ (270-g/m$^2$) elastomeric backing. Each sample of tufted substrate was held in a square pin frame, which measured 18 inches (46 cm) on each side, and coated with "Durogan" styrene rubber foam latex (made by Midin Corp. of Calhoun, Ga). Each back-coated sample was dried and cured, while still held on the frame, by being heated for 6 minutes in an oven operating at a temperature of about 250° F. (121° C.). If desired, the sample could be subjected to a tensile load in the LD and/or TD, during back-coating and curing, to adjust directional stretch and grab strength properties.

A detailed description of the fibrous substrates and stretching, heating and shrinking treatments that were used in the preparation of each tufted-and-back-coated sample is given in the Examples below. The table following the Examples summarizes the stretchability (at break), the elastic stretch and the grab strength of the sample at various stages of the production of the tufted fabrics.

Example 1

This example illustrates the preparation of a strong, elastic tufted pile fabric in accordance with the invention :made with a stitchbonded staple fiber fabric substrate.

A blend of staple fibers containing 75% by weight of 3-denier (3.3 dtex), 1.5-inch (3.8-cm) long Type 226 nylon fibers (sold by E. I. du Pont de Nemours & Co.) and 25% of 3-denier (3.3 dtex) 3-inch (7.6-cm) long Type 262 "Dacron" polyester binder fibers (sold by E. I. du Pont de Nemours & Co.) of somewhat lower melting temperature than the melting temperature of the nylon fibers, was formed into a 3-oz/yd$^2$ (102-g/m$^2$) web on a Hergeth Card and Cross-lapper. The web was lightly needled with 40 penetrations/in$^2$ (6.2/cm$^2$) on a Dilo needler. The needled web was then stitchbonded on a Liba two-bar stitchbonder using a 140-denier (155-dtex) textured nylon yarn as stitching yarn. Each bar had twelve threaded needles per inch (4.7/cm) in the TD and was used to form 10.5 stitches per inch (4.1/cm) in the LD. One bar formed 0-1,1-0 chain stitches and the other bar formed 1-0,1-2 tricot stitches. The stitches are identified with conventional warp-knitting nomenclature.

After stitching, the product properties were re-balanced by stretching the width from 90 inches (229 cm) to 153 inches (389 cm) on a tenter frame and overfeeding 15% in the longitudinal direction. The tenter operated at a speed of 30 yards (27 m) per minute and at a temperature of 375° F. (191° C.). The stretched heat-set product weighed 3.2 oz/yd$^2$ (108 g/m$^2$), was quite stiff in the length and transverse directions, but was quite easy to tuft, with low neck-down, low deflection under the needles and good "tuft-bind".

The thusly produced tufted substrate was less stretchable in LD (20%) and more stretchable in TD (40%). Prior to the back-coating step, the stretch properties of the tufted fabric were "re-balanced" by stretching the fabric about 20% LD on a pin-frame while the width was permitted to shrink about 10%. The re-balanced tufted substrate was then back-coated with "Duragon" styrene rubber latex, the dry weight of which amounted to 8 oz/yd$^2$ (270 g/m$^2$). The resultant back-coated, tufted pile fabric had a stretchability of 30 and 35% in LD and TD, respectively, was of high grab strength and had an elastic stretch of 20 and 30% in LD and TD, respectively.

Example 2

Example 1 was repeated except that a different fibrous layer, different stitchbonding stitches and a different set of re-balancing conditions were used to prepare an elastic tufted pile nonwoven fabric of the invention.

A 2-oz/yd$^2$ (68-g/m$^2$) spunlaced fabric, "Sontara" Style 8005, made by E. I. du Pont de Nemours & Co. from hydraulically entangled 0.87-inch (2.2-cm) long, 1.35-denier (1.5-dtex) polyester fibers was stitchbonded on the same two-bar Liba machine as was used in Example 1. The machine was threaded in the same manner, and formed the same numbers of stitches as in Example 1, except that the stitching yarn was a 70-den (77-dtex), 34-filament, textured nylon yarn and the second bar formed two-over 1-0,2-3 stitches. The two-over stitches had been selected to reduce TD stretch. The resultant web performed well during tufting.

After tufting, the stretch was highly unbalanced (about 5% LD and more about 100

TD). The stretch was more nearly equalized in both directions by stretching the tufted product approximately 40% TD while allowing about 20% shrinkage LD. The re-balanced product was then back-coated and cured to produce a strong, elastic tufted fabric having elastic stretch of about 30% LD and 25% TD.

Example 3

This example provides a third illustration of the preparation of a strong, elastic tufted fabric in accordance with the invention.

Polyester staple fibers of 3-den (3.3-dtex), 3-inch (7.6-cm) long were formed into a 3-oz/yd$^2$ (102-g/m$^2$) web with a Hergeth card and cross-lapper. The web was then needled with 90 penetrations/in$^2$ (14/cm$^2$) with a Dilo needler. The needled web was stitchbonded with the two-bar Liba stitchbonder of Example 1 using a 150-den (167-dtex), 34-filament, textured polyester yarn for the stitching thread. Each bar had 12 needles/in (4.7/cm). Every other needle of the front bar was threaded. The back bar was fully threaded. The front bar formed 1-0,2-3 jersey stitches and the back bar formed 1-0,0-1 chain stitches. Each bar formed 7.7 stitches/inch (3/cm) in the LD. The stitchbonded substrate, which weighed 4.1 oz/yd$^2$ (139 g/m$^2$), was placed on a tenter frame under high tension with no overfeed in the LD and sufficient tension TD to prevent change in the sample dimensions and heated for 30 seconds at a temperature of 340° F. (170° C.). The stitchbonded substrate had a stretchability of about 5% LD and about 110% TD and had good grab strength in each direction. The thusly prepared substrate was then tufted and back-coated as in Example 1. The resultant strong, elastic, tufted fabric had the properties summarized in the table below.

Examples 4, 5 and 6

Example 1 was repeated with the stitchbonded fibrous substrate being replaced by spunbonded webs of substantially non-bonded continuous polyester filaments ("Reemay" Style 503, sold by Reemay, Inc. of Old Hickory, Tenn.). For feeding to the tufter, in Example 4, one 1-oz/yd$^2$ (33.9-g/m$^2$) layer of "Reemay" was used; in Example 5, two layers; and in Example 6, three such 1-oz/yd$^2$ layers were used. Properties of the resultant elastic tufted pile nonwoven fabrics are included in the Table below. Note the desirable elastic stretch and strength properties achieved by the fabrics of the invention.

Comparison A

This comparison shows that an elastic tufted fabric of the invention is not obtained when the starting fibrous substrate does not possess initial stretchability. A commercial, thermally bonded, 3.6-oz/yd² (122-g/m²) "Typar" spunbonded continuous filament polypropylene, primary carpet backing material (available from E. I. du Pont Luxembourg S. A.) having substantially zero stretchability LD and TD (i.e., less than about 3%) was tufted and back-coated and cured in the same way as were the fibrous samples of Examples 1–6. Although the "Typar" was processed easily through tufting, coating and curing, and provided a very strong tufted product, the tufted product completely lacked stretchability, as shown in the table below.

TABLE

| | Properties (LD/TD) of materials* | | | | | | |
|---|---|---|---|---|---|---|---|
| | Examples of Invention | | | | | | |
| | 1 | 2 | 3 | 4 | 5 | 6 | Comparison |
| Fibrous Substrate | | | | | | | |
| Stretchability, % $S_b$ | 40/60 | 5/100 | 5/110 | 57/44 | 55/48 | 51/67 | 0/0 |
| Grab strength, lb | 93/68 | 98/85 | 104/92 | 8/9 | 11/17 | 26/30 | 133/75 |
| N | 414/303 | 436/378 | 463/409 | 33/38 | 50/74 | 114/135 | 592/334 |
| Tufted Substrate | | | | | | | |
| Stretchability, % $S_b$ | 20/40 | 5/100 | 0/100 | 146/166 | 158/128 | 157/105 | 0/0 |
| Grab strength, lb | 88/72 | 103/92 | 108/92 | 19/15 | 25/11 | 19/9 | 125/70 |
| N | 392/320 | 458/409 | 481/409 | 85/65 | 109/50 | 85/41 | 556/312 |
| Tufted & Coated Substrate | | | | | | | |
| Stretchability, % $S_b$ | 30/35 | 35/40 | 0/100 | 117/nm | 120/150 | 14/108 | 0/0 |
| Grab strength, lb | 69/175 | 71/60 | 100/88 | 69/nm | 94/94 | 89/77 | 83/80 |
| N | 307/779 | 316/267 | 445/392 | 307/nm | 418/418 | 396/343 | 369/356 |
| Elastic stretch, % $S_e$ | 20/30 | 30/25 | 0/85 | 33/38 | 17/19 | 22/22 | 0/0 |

*nm means no measurement made

We claim:

1. In a tufted pile nonwoven fabric having a nonwoven fibrous substrate, yarns tufted through the substrate and an elastomeric backing adhered to the substrate, the substrate having a top face, a back face, a longitudinal direction, and a transverse direction, the yarns forming pile tufts that protrude from the top face of the substrate and tufted yarn bases that penetrate and re-enter the back face of the substrate, wherein the improvement comprises:
   the nonwoven fibrous substrate comprising substantially nonbonded staple fibers or nonbonded continuous filaments of about decitex 1 to 22 and the tufted-and-backed pile fabric having an elastic stretch of at least 10% in the longitudinal and/or transverse direction of the fabric and a grab strength in the longitudinal and transverse directions of at least 134 Newtons.

2. A tufted fabric in accordance with claim 1 wherein the elastic stretch is at least 20% and the grab strength is at least 223 Newtons.

3. A tufted fabric in accordance with claim 1 wherein the tufted fabric weighs in the range of 200 to 2,370 g/m² and comprises 68 to 1,360 g/m² of tufting yarn, 68 to 200 g/m² of fibrous substrate and 68 to 680 g/m² of an elastomeric backing.

* * * * *